Dec. 5, 1961     S. H. DOWNS ET AL     3,011,693
APPARATUS RELATING TO CENTRIFUGAL WHEEL
INLET BOUNDARY CONTROL

Filed Dec. 5, 1956     6 Sheets-Sheet 1

INVENTORS
SEWELL H. DOWNS
WENDELL C. ZELUFF
BY
Woodhams Blanchard and Flynn
ATTORNEYS

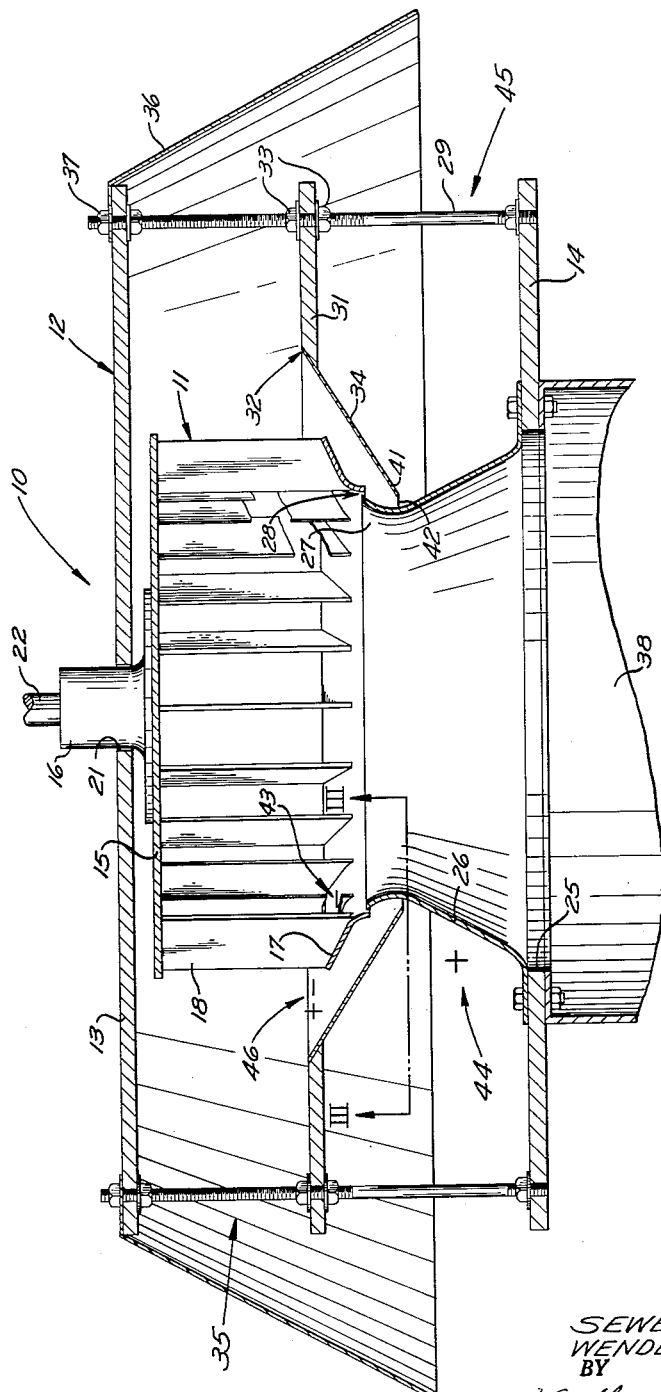

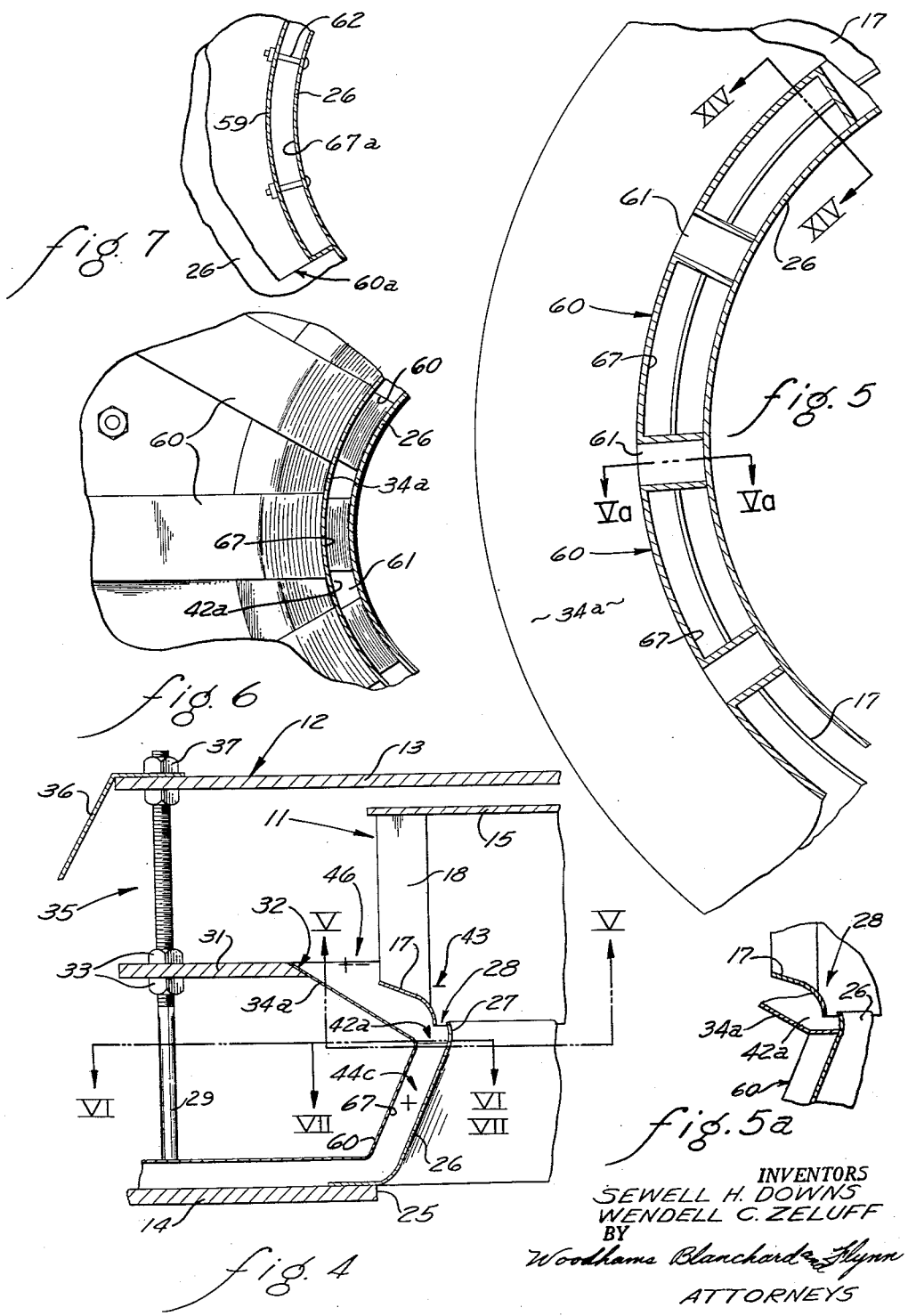

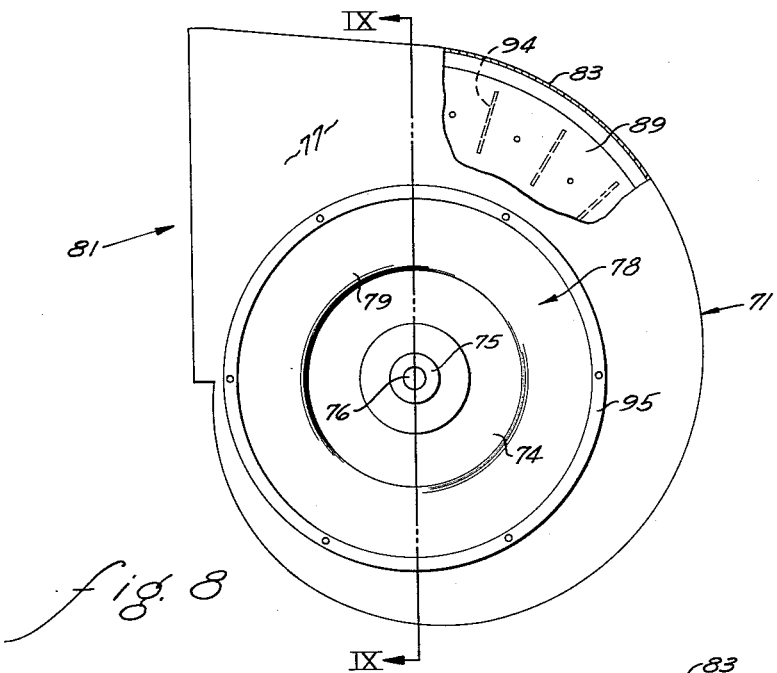
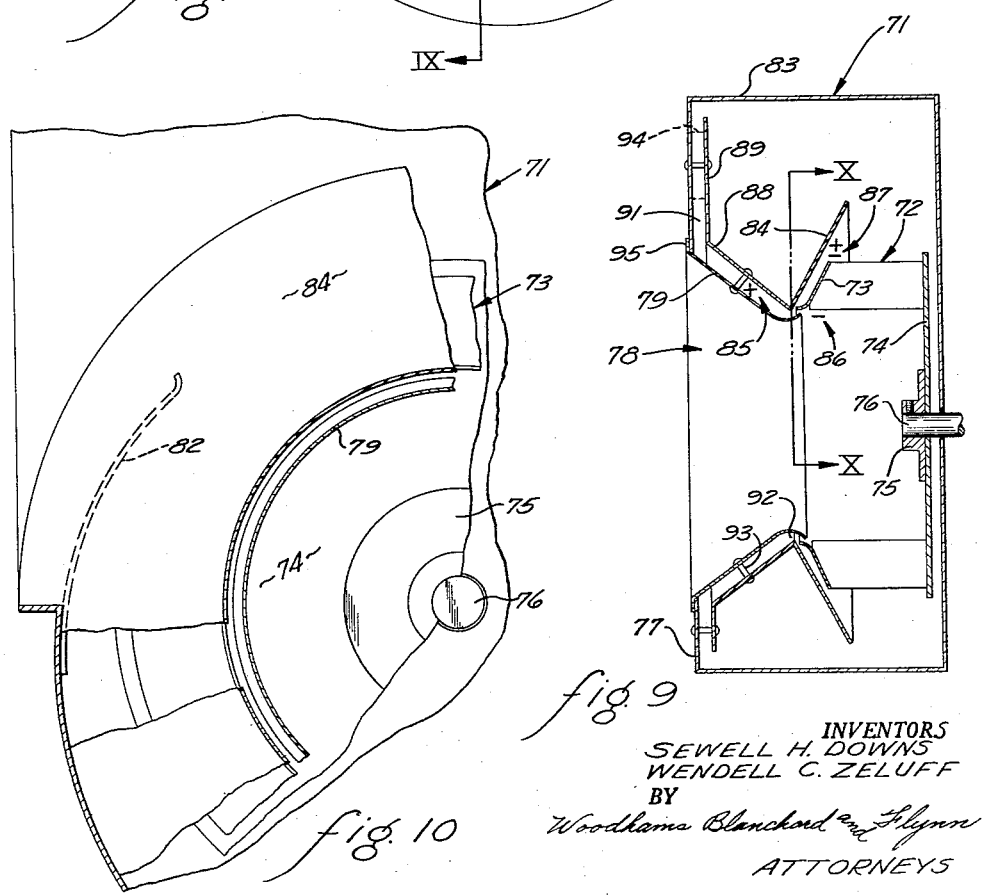

INVENTORS
SEWELL H. DOWNS
WENDELL C. ZELUFF
BY
Woodhams Blanchard & Flynn
ATTORNEYS

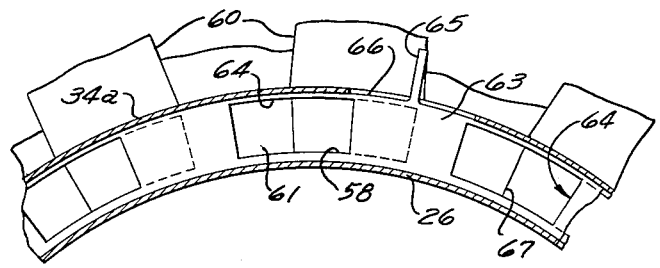
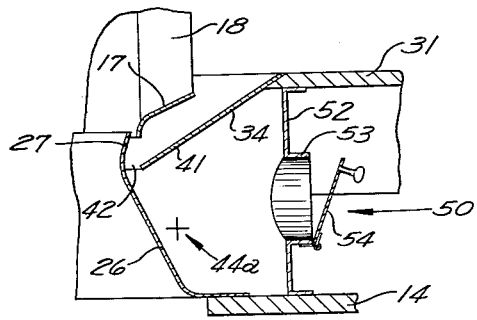
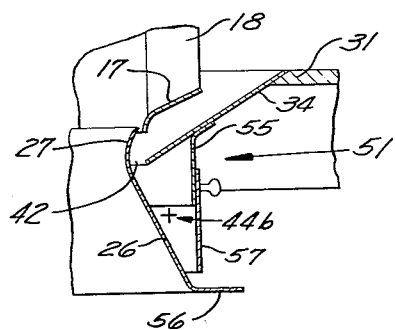
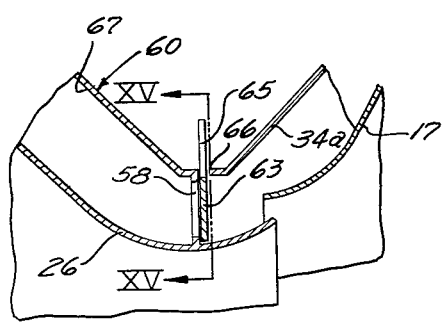

United States Patent Office 3,011,693
Patented Dec. 5, 1961

3,011,693
APPARATUS RELATING TO CENTRIFUGAL
WHEEL INLET BOUNDARY CONTROL
Sewell H. Downs, Kalamazoo, and Wendell C. Zeluff, Kalamazoo Township, Kalamazoo County, Mich., assignors to Clarage Fan Company, Kalamazoo, Mich., a corporation of Michigan
Filed Dec. 5, 1956, Ser. No. 626,392
19 Claims. (Cl. 230—127)

This invention relates, in general, to an apparatus for increasing the performance of a centrifugal fan and, more particularly, to a type thereof whereby the turbulence adjacent to the rim (and the adjacent discharge region) on a rim-type, centrifugal impeller, rotating adjacent to an inlet cone, may be materially reduced, thereby increasing the output capacity and/or performance of said wheel for a given set of operating conditions.

It has been known by persons familiar with the performance of rim-type, blower wheels, particularly of the non-overloading type, that a considerable portion of each blade adjacent to the wheel inlet rim operates at a relatively very low efficiency, thereby reducing the over-all performance of the wheel by comparison with its theoretical potential as an air-moving device. It is believed that this reduced efficiency is due in great part to the fact that the air flow through the inlet cone of a fan housing occurs in an axial direction with respect to the fan wheel and is then rapidly changed to a radial direction of flow. Due to its inertia, the air tends to move away from the wheel rim as it makes the turn. The resultant, low pressure zone thus produced adjacent to the wheel rim creates turbulence, which compounds the problem by further interrupting the air flow in the region of the low pressure zone.

Attempts have been made to overcome this problem by carefully flaring the inner end of the inlet cone and providing a corresponding flare and curvature in the wheel rim. However, the problem has continued to persist, in spite of such streamlining, largely because of three factors. First, it is virtually impossible to obtain the required smooth and streamlined fit between the inlet cone and the adjacent portion of the wheel rim with conventional production methods of fabricating air-moving equipment. Second, the operating tolerances between the inlet cone and wheel rim in production equipment cannot be made sufficiently close to prevent some recirculation of air from the wheel outlet back around the outside of the wheel rim, then between the wheel rim and the inlet cone and back into the interior of the wheel. This recirculation, which is induced by the low pressure zone just within the wheel inlet, tends to aggravate the problem of turbulence by introducing output air back into the interior of the wheel, which output air is already turbulent due to its substantial circular components.

However, assuming that it would be possible to completely and perfectly streamline the cone and inlet rim of the wheel, and, also, to completely seal off the space between the inlet cone and the wheel inlet rim, a third factor arises in that it is sometimes actually desirable to have air flow between the inlet rim and the inlet cone. More specifically, there are certain installations in which the air-moving device or fan must deliver a relatively high volume at a relatively low pressure. Under such conditions of delivery, it is sometimes advantageous, if not essential, to have an appreciable clearance between the inlet cone and the adjacent wheel rim, in order to provide a stable performance. Thus, the fan manufacturer must design his equipment with some clearance between the inlet cone and wheel rim to accommodate such installations where the delivery and/or stability require it.

Thus, it has for many years appeared to the industry that the problem of overcoming the turbulence adjacent to the wheel rim could not be completely solved because the elimination of one of its causes, such as the space between the rim and cone, would create an additional problem, namely, an unstable performance under some conditions, or aggravate one of its other causes, namely, the limits of production fabrication. Although much attention has been given to this problem, it has existed, without satisfactory solution, practically since the first appearance of this type of fan structure.

Accordingly, it has been a primary object of this invention to provide apparatus for substantially increasing the performance of a conventional, rim-type, centrifugal impeller by reducing the amount of turbulence in the region of the wheel rim, without materially altering the existing shapes used in the inlet cone and wheel rim, without reducing the construction tolerances between the inlet cone and wheel rim, without reducing the effectiveness of the fan for use under conditions requiring a relatively high output volume and relatively low pressure, hence, a substantial clearance between the inlet cone and wheel rim, and without necessitating greater care and/or skill in the fabrication or operation of the fan utilizing such apparatus.

A further object of this invention has been the provision of apparatus, as aforesaid, whereby smoothly flowing air, having substantially no circular components and referred to hereinafter as "non-turbulent air," is introduced to an arcuate zone substantially embracing said inlet cone adjacent to the rim of a rim-type wheel, whereby such non-turbulent air is moved axially toward said wheel and thence radially along the inner and outer surfaces of said wheel rim, and whereby both the recirculation of turbulent air from the wheel outlet along the outer surface of said wheel rim, as well as the low pressure zone and turbulence existing along the inner surface of said wheel rim, are substantially reduced, if not eliminated.

A further object of this invention has been the provision of apparatus, as aforesaid, which can be adapted to presently existing forms of centrifugal fans, which will not materially increase the cost of building or operating such fans, and which will require little or no maintenance for completely satisfactory operation.

Other objects and purposes of this invention will become apparent to persons familiar with this type of equipment upon reading the following specification and examining the accompanying drawings, in which:

FIGURE 2 is a sectional view taken along the line II—II of FIGURE 1.

FIGURE 4 is a fragment of FIGURE 2, and includes a modification thereof.

FIGURE 5 is a sectional view taken along the line V—V of FIGURE 4.

FIGURE 5a is a sectional view taken along the line Va—Va in FIGURE 5.

FIGURE 6 is a sectional view taken along the line VI—VI of FIGURE 4.

FIGURE 7 is a sectional view substantially as taken along the line VII—VII of FIGURE 4, and indicating a modified structure thereof.

FIGURE 8 is a broken, side elevational view of a centrifugal fan structure of the scroll type and embodying the invention.

FIGURE 9 is a sectional view taken along the line IX—IX of FIGURE 8.

FIGURE 10 is a sectional view substantially as taken along the line X—X of FIGURE 9.

FIGURE 14 is a sectional view substantially as taken along the line XIV—XIV of FIGURE 5 and showing a device for controlling the fan performance.

FIGURE 15 is a sectional view taken along the line XV—XV of FIGURE 14.

FIGURE 16 is a fragment of FIGURE 2 modified to include a device for controlling the fan performance.

FIGURE 17 is a fragmentary view similar to that of FIGURE 16 and showing a further modification.

Figure 1:
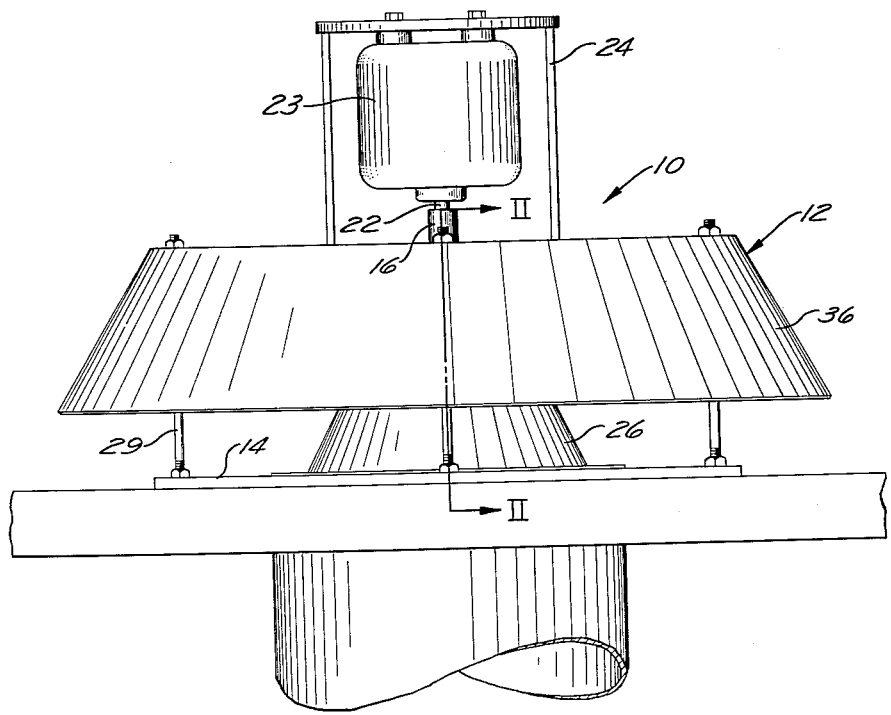
FIGURE 1 is a side elevational view of a structure embodying the invention.

For the purpose of convenience in description, the terms "upper," "lower," and derivatives thereof, will have reference to the fan structures disclosed herein in their normal positions of operation, as indicated in FIGURES 1 and 8. The terms "inner," "outer," and derivatives thereof, will have reference to the geometric centers of said fan structures and parts thereof. The term "non-turbulent air" will have reference to smoothly flowing air having negligible circular components.

GENERAL DESCRIPTION

The invention, to which this application relates, is characterized in general by a centrifugal fan structure, including a single inlet fan housing and a single inlet, centrifugal impeller rotatably supported within said housing co-axial with the inlet opening thereof. Said impeller is provided with an inlet rim adjacent to the inlet opening in said housing, and said housing is provided with an inlet cone, which is mounted in the inlet opening of the fan housing and extends into the inlet opening of the impeller. A conically shaped guide ring is supported upon the fan housing so that it co-axially encircles the wheel rim and the adjacent portion of the inlet cone. The wheel rim and the guide ring are spaced radially outwardly from the inlet cone, and are spaced from each other. Thus, air can flow from the relatively high pressure zone, which encircles the inlet cone, to the relatively low pressure zones located within said wheel and adjacent to the periphery of said rim. The result of this flow, when properly controlled, increases substantially the performance of the fan structure.

Detailed construction

As shown in FIGURES 1 and 2, the invention may be embodied in a roof ventilator 10, having an impeller wheel 11, which is rotatably supported within a housing 12, having a substantially horizontal, upper or closed side plate 13 and a lower or inlet side plate 14 which is preferably parallel with said upper side plate. The wheel 11 is of the single inlet type, having a back plate 15 upon which a hub 16 is secured in a substantially conventional manner. Said wheel also has an inlet rim 17 and a plurality of blades 18, which are secured to, and extend between, said back plate 15 and said inlet rim 17 in a substantially conventional manner. In a preferred embodiment of the invention, the blades 18 are preferably of a substantially non-overloading type. However, it will become apparent that the substance of the invention applies in a lesser degree to fan structures wherein the blades are of the overloading type.

The wheel hub 16 extends through an appropriate opening 21 in the upper side plate 13 of the fan housing 12 for engagement with the shaft 22 of a conventional prime mover, such as the motor 23, which may be supported, as by means of the motor bracket 24, upon and above the upper side plate 13. The lower side plate 14 of said housing 12 is provided with a circular inlet opening 25, which is substantially co-axial with the wheel 11 in a conventional manner. An inlet cone 26 is mounted upon the lower side plate 14 adjacent to, and co-axial with, the inlet opening 25 therein, and converges upwardly therefrom toward the wheel 11. The upper end 27 of the inlet cone 26, which is flared radially outwardly, preferably extends slightly into, and is spaced radially inwardly from, the inlet rim 17 on the wheel 11, thus providing an annular passage 28 between the upper end 27 of the cone 26 and the adjacent edge of the inlet rim 17.

The upper and lower side plates 13 and 14 of the housing 12 are held in fixed positions with respect to each other by means of the threaded rods 29. A mounting ring 31, having a central opening 32, is supported upon said rods 29, as by means of the nuts 33, so that it co-axially encircles the wheel 11 adjacent to the inlet rim 17. A conically-shaped guide ring 34 is snugly disposed within the central opening 32 of, and is secured to, said mounting ring 31, as by welding. Said guide ring 34 preferably, but not necessarily, converges downwardly toward said inlet cone 26 from a position located upwardly, and outwardly, of the inlet rim 17, thereby telescoping said inlet rim. The mounting ring 31 and the adjacent portion of the guide ring 34 combine with the radially outer portion of the upper side plate 13 to define an annular, outlet passageway 35 for the housing 12. A conical weather shield 36 is secured to the upper side plate 13 near the periphery thereof, as by means of the rods 29 and nuts 37 thereon, and said shield extends divergingly downwardly beyond the mounting ring 31. A duct 38 of a conventional exhaust system may be connected to the lower side plate 14 adjacent to the inlet opening 21 thereof, in any convenient manner.

Figure 3:
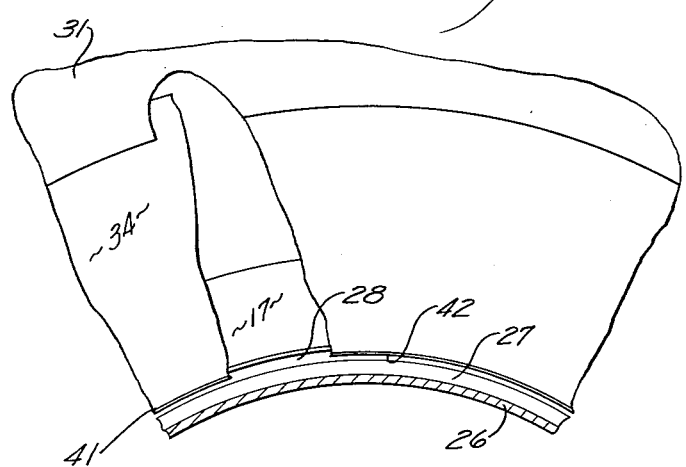
FIGURE 3 is a broken, sectional view substantially as taken along the line III—III of FIGURE 2.

The radially inner edge 41 of the conical guide ring 34 (FIGURE 3), which is also its lower edge as shown in FIGURE 2, is uniformly spaced radially outwardly from the radially outer surface of the inlet cone 26 to provide an annular passageway 42 near the upper end 27 of said inlet cone. For a fan structure of the type shown in FIGURES 1 and 2, the optimum performance appears to occur when the annular passage 28 has an effective area which is between approximately 20 percent and 100 percent of the corresponding area of the annular passageway 42. However, conditions may arise, particularly in other types of fan structures, where this relationship between the areas of the passage 28 and the passageway 42 may exceed the limits of the above mentioned percentages.

It has been found that, when the fan wheel is rotated in fan structures of the general type illustrated in FIGURES 1 and 2, a low pressure zone ordinarily exists within the fan wheel, which zone extends to the region adjacent to the inner surface of the inlet rim 17, as indicated by the minus sign at 43. The pressure in the zone 43 is, of course, relative to atmospheric pressure or the pressure within the duct 38 of an exhaust system. Thus, by comparison with the low pressure zone 43, there is a high pressure zone 44 extending around the external surface of the inlet cone 26, between the opposing surfaces of the guide ring 34 and the lower side plate 14. The high pressure zone contains air from atmosphere, which can move substantially without interference, hence without creating any substantial amount of turbulence, into said zone 44 through the annular space 45 between the mounting ring 31 and the lower side plate 14.

A zone 46 of intermediate pressure exists radially outwardly of the wheel 11, when said wheel rotates, and extends to the region disposed adjacent to the wheel inlet rim 17. The pressure in zone 46 is less than the pressure in zone 44 and greater than the pressure in zone 43.

If, by way of comparison, conventional existing methods were used to fabricate the fan structure 10 (FIGURE 2), the annular passageway 42 would be closed, thereby causing a movement of output air, when said wheel 11 rotates, in a radially inward direction between the inlet rim 17 and the guide ring 34, and thence through the annular passage 28 into the low pressure zone 43, because of the relatively higher pressure existing in the intermediate zone 46. The effect of the invention upon this presently existing type of circulation will be dealt with hereinafter in detail.

Flow control devices 50 and 51, as shown in FIGURES 16 and 17, respectively, may be provided for conditions in which it becomes desirable to control the amount of air moving from the relatively high pressure zone 44 through the annular passageway 42 into the zones 43 and 46 of relatively low pressure. The flow control device 50 is comprised of a cylinder 52, which is secured at its opposite axial ends upon the opposing surfaces of the mounting ring 31 and lower side plate 14. Said cylinder 52 is preferably co-axial with, and spaced radially outwardly from, both the guide ring 34 and the inlet cone 26. Said cylinder 52 is provided with one or more flanged openings 53, which are equipped with closure members 54 for manually or otherwise controlling the amount of air which can pass through said openings 53, hence into zone 44a.

The flow control device 51 is comprised of a cylinder 55, which is secured to, co-axial with, and extends downwardly from, the guide ring 34 toward the radially extending flange 56 on the lower end of inlet cone 26. Said cylinder 55, which is spaced upwardly from said flange 56, is slidably embraced by a sleeve 57, which is movable downwardly along the cylinder 55 into a position completely closing the space between the cylinder 55 and said flange 56.

It will be seen, therefore, that both the flow control devices 50 and 51 are capable of controlling the amount of air which can move from atmosphere into the high pressure zones 44a and 44b of FIGURES 16 and 17, respectively. As a result of the control devices 50 and 51, the cross-sectional area of the annular passageway 42 may be set, during the fabrication, at its maximum size, after which the flow control devices 50 and 51 are then utilized, in a manner discussed in detail hereinafter, for controlling the effect of the passageway 42, hence the performance of the fan structure associated therewith.

As shown in FIGURES 4, 5 and 6, it may be desirable to introduce air into the relatively high pressure zone 44c (FIGURE 4) under pressure which is in excess of the ambient, or atmospheric, pressure. In such case, and as shown in FIGURES 5 and 6, one or more conduits 60 are provided, each conduit having a passageway 67 to convey gas from any convenient source under pressure, not shown, to the annular passageway 42a between the radial inner end of the guide ring 34a and the inlet cone 26. The passageway 67 may be relatively small in cross-sectional area by comparison with the cross-sectional area of the annular passageway 42a, thereby making it advantageous to have a plurality of such conduits, as shown in FIGURES 5 and 6. On the other hand, said passageway 67 may be relatively large in cross-sectional area, as shown at 67a in FIGURE 7, thereby necessitating a lesser number to accomplish the same results. Where a large number of conduits 60 are utilized, it may be advantageous in some circumstances to space the conduits and provide wall members 61 (FIGURES 5 and 6) between each pair of adjacent conduits 60 along the inner edge of the ring 34a. In such case, each conduit 60 is comprised of an elongated channel-shaped member, the flanges of which are secured along their free edges, as by welding, to the outer surface of the cone 26 and the upper surface of the side plate 14.

Where, as shown in FIGURE 7, a relatively wide passageway 67a is utilized, means, such as the bolts 62, may be provided for supporting the outer wall 59 of the conduit 60a with respect to, and upon, the inlet cone 26.

As shown in FIGURES 14 and 15, the passage of air from the conduits 60 through the annular passageway 42a may be controlled by providing a flat, annular ring 63 concentrically within the passageway 42a adjacent to the wall members 61. Said annular ring 63 is provided with a plurality of control openings 64, which preferably correspond in shape and relative position to the shapes and relative positions of the outlet openings 58 in the adjacent ends of the passageway 67 in the conduits 60. Said ring 63 is also provided with a radially outwardly extending arm 65, which extends through an appropriate opening 66 in the guide ring 34a adjacent to the inner end thereof. Accordingly, registration of the control openings 64 with the adjacent outlet openings 58 can be varied by means of the arm 65, for the purpose of controlling the air movement through the passageway 42a.

In order to facilitate the disclosure of the invention, the preceding description has been directed to a relatively simple fan structure designed for use as a roof ventilator 10. However, upon examining FIGURES 8 through 13, inclusive, in the light of the above disclosure, it will be recognized that the concepts of the invention can be applied in a similar manner to other types of fan structures, including those having a scroll-type housing, such as that shown at 71 in FIGURES 8 and 9. The wheel 72, which may be substantially the same as the wheel 11 described hereinabove, has an inlet rim 73 and a back plate 74, which back plate is secured to a hub 75 mounted upon means, such as the shaft 76, for rotation in a substantially conventional manner. The housing 71 has an inlet side plate 77 provided with a suitable inlet opening 78, in which the inlet cone 79 is disposed so that the converged inner end thereof extends slightly into, and is spaced radially inwardly from, the wheel inlet rim 73. The housing 71 has an outlet opening 81 and cut-off 82, in a substantially conventional manner. Because of the spiral shape of the peripheral wall of scroll sheet 83 of the housing 71 with respect to the axis of the wheel 72, it becomes advantageous, as shown in FIGURE 10, to notch or otherwise modify the radially outer portion of the conical guide ring 84, which is utilized to guide the air as it moves from the relatively high pressure zone 85 (FIGURE 9) to the low pressure zone 86 and/or intermediate pressure zone 87.

In adapting the invention to a scroll-type fan structure, it must be recognized that the high pressure zone 85 may be disposed within the housing so that it is not, under normal circumstances, immediately accessible to atmospheric air. Accordingly, and as shown in FIGURE 9, it is believed advantageous to provide a conically shaped member 88 around, and spaced radially outwardly from, the inlet cone 79 and connected at its converging end to the radially inner end of the guide ring 84, thereby providing a conical space, in which said high pressure zone 85 is disposed. The conical member 88 may be provided with a radially extending flange 89 integral with its radially outer edge, which is spaced from the inlet side plate 77 and extends toward, but is spaced from, the scroll sheet 83. Thus, air within the housing 71 must pass through the annular passageway 91, between the side plate 77 and the radial flange 89, into the annular, high pressure zone 85, and thence through the annular passageway 92, between the guide ring 84 and the inlet cone 79, in order to reach the zones 86 and 87 in a manner about as set forth in detail hereinabove with respect to the roof ventilator structure 10 (FIGURES 1 and 2).

The conical member 88 (FIGURE 9) and its flange 89, are mounted upon the adjacent portions of the inlet cone 79 and side plate 77 by means such as the rods 93. Where the air within the housing 71 tends to rotate with the wheel 72 about the axis thereof, thereby imparting to such air a circular movement which may be undesirable under some circumstances, such movement can be arrested by radially disposed vanes, such as those shown in broken lines at 94 in FIGURES 8 and 9, which extend between, and are secured to, the opposing surfaces of the flange 89 and inlet side plate 77. The vanes 94 will act as air straighteners.

Figure 11:
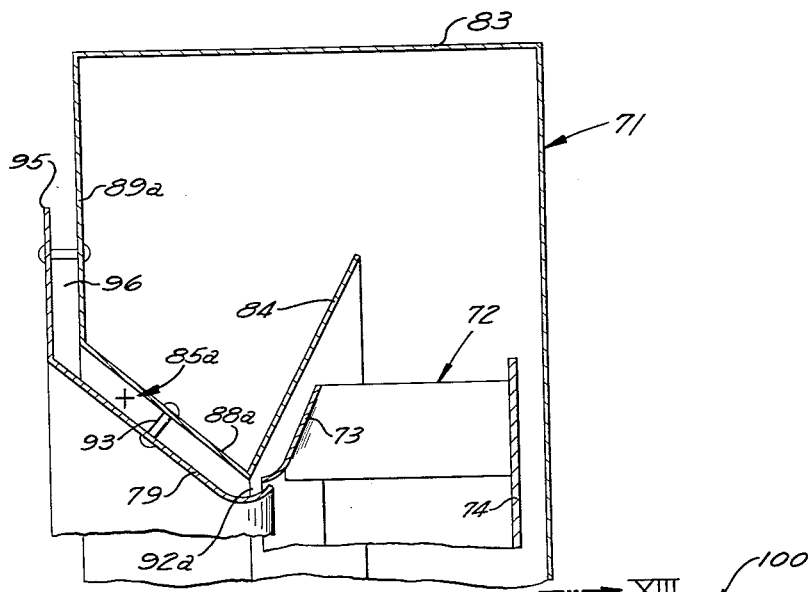
FIGURE 11 is an enlarged fragment of FIGURE 9, showing an alternate structure therefor.

As shown in the modified structure of FIGURE 11, the radial flange 89a on the conical member 88a may be extended to engage the scroll sheet 83 of the housing 71 and thereby become, in effect, the inlet side plate of the housing 71. In such case, the flange 95, which is integral with, and extends outwardly from, the radially outward edge of the inlet cone 79, combines with the opposing surface of the radial flange 89a to provide a circular passageway 96, which communicates with the outer end of the annular, high pressure zone 85a. Thus, outside or atmospheric air can move through the circular passageway 96 into the conically shaped, high pressure zone 85a, and thence through the annular pasageway 92a, in a manner substantially as discussed hereinabove with respect to the corresponding structure of the roof ventilator 10 (FIGURES 1 and 2).

Figure 12:
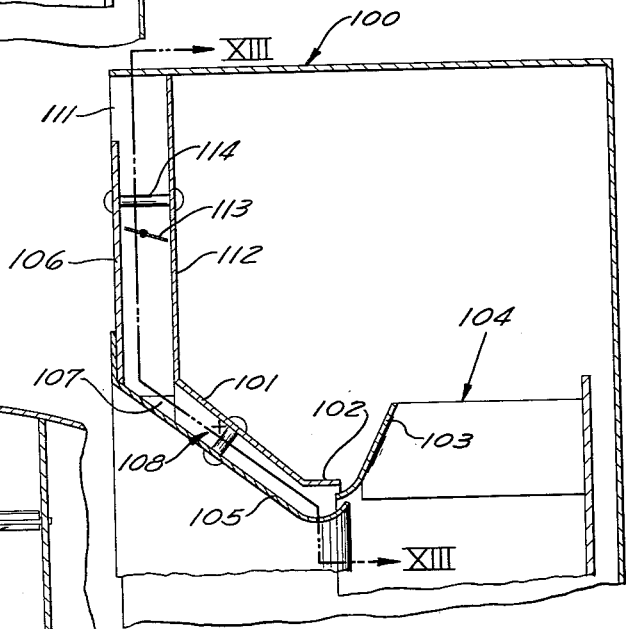
FIGURE 12 is an enlarged fragment of FIGURE 9, showing a further modification thereof.
Figure 13:
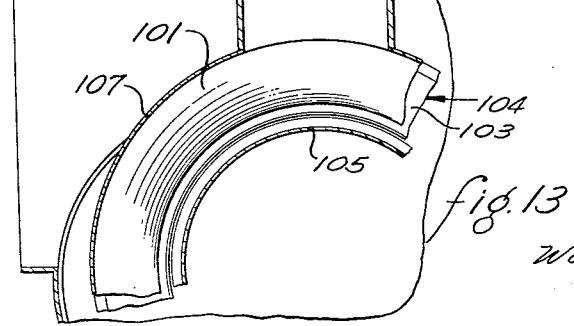
FIGURE 13 is a sectional view taken along the line XIII—XIII of FIGURE 12.

In a further modification, shown in FIGURES 12 and 13, a housing 100, which may be substantially identical to the housing 71 shown in FIGURES 8 and 9, is provided with a conical member 101, which may be substantially similar to the conical member 88a (FIGURE 11). However, said conical member 101 is provided with an integral, cylindrical portion 102, which encircles, and is spaced radially outwardly from, the adjacent portion of the rim 103 on the wheel 104. Thus, the wheel rim 103 extends slightly into the space between the cylindrical portion 102 of the conical member 101 and the outwardly flared, inner end of the inlet cone 105, which is supported in a conventional manner upon the inlet side plate 106 of the housing 100. A peripheral wall 107 extends between, and is secured to, the radially outward edge of the conical member 101 and the adjacent portion of the inlet side plate 106, thereby combining with the conical member 101 and the opposing surface of the inlet cone 105 to define a high pressure zone 108.

An opening 111 is provided through the inlet side plate 106 and communicates with the high pressure zone 108 through the duct 112. A damper 113 may be provided within the duct 112 for the purpose of controlling the amount of gas which may pass through said duct. The duct 112 and conical member 101 may be supported upon, and with respect to, the side plate 106 and inlet cone 105, respectively, by means, such as the support rods 114. In the particular embodiment shown in FIGURES 12 and 13, the cylindrical portion 102 of the conical member 101 serves in part the function of a conical guide ring, such as that shown at 34 in FIGURE 2 and at 84 in FIGURE 9. The absence of a guide ring, such as the guide rings 34 and 84, throughout the length of, and with respect to, the wheel rim 103 may be overcome, at least in part, by introducing air, or other appropriate gas, through the opening 111 and the duct 112 into the zone 108 under positive pressure.

*Operation*

Referring first to the roof ventilator structure 10 shown in FIGURES 1 and 2, it will be recognized that, when the wheel or impeller 11 thereof is rotated by the motor 23 in a substantially conventional manner within the housing 12, certain differential pressure zones will be developed within the housing and wheel as a result of such rotation. Under normal circumstances, the pressure within the zone 44 (FIGURE 2) will, in this type of structure, be substantially at atmospheric pressure. The pressure within the wheel 11, and particularly in the zone indicated at 43 in FIGURE 2, will be at a pressure which is somewhat lower than the pressure in the zone 44. The difference between these pressures will depend upon several factors including the static pressure developed by the wheel 11. During operation of the fan, the pressure in the zone 46 will be less than the pressure in the zone 44, but greater than the pressure in the zone 43. When the wheel 11 is being rotated, air will be drawn through the duct 38 and the inlet cone 26 into the wheel 11 and then expelled by the blades 18 between the rim 17 and back plate 15, in a substantially conventional manner. As the air entering the cone 26 is caused by the wheel 11 to move around the upper end 27 of said cone 26 and thence along the inner surface of the rim 17, a low pressure, turbulent zone 43 will tend to occur in the region next to the inner surface of said rim 17. However, due to the low pressure within the wheel 11, non-turbulent air will move from the zone 44 through the annular passageway 42 and through the annular passage 28 into said zone 43. The air not only tends to overcome the relatively abnormal low pressure zone immediately adjacent to the rim 17, but also tends to streamline the inlet air as it moves along said rim in a radially outward direction, thereby greatly reducing the performance destroying turbulence which would otherwise exist in the zone 43 adjacent to said rim 17.

As stated previously, the relatively higher pressure in the zone 46 with respect to the zone 43 would ordinarily tend to urge a circulation of outlet air radially inwardly between the guide ring 34 and the wheel rim 17, for the purpose of passing through the annular passage 28 and overcoming the relatively low pressure within the zone 43 adjacent to said rim 17. It is well recognized that the outlet air in the zone 46 is normally relatively turbulent. However, part of the air in the high pressure zone 44 will, after passing through the annular passageway 42, move radially outwardly between the guide ring 34 and the wheel rim 17 and into the zone 46 of intermediate pressure, thereby opposing any tendency for a contrary movement of air through this area. Thus, the flow of relatively non-turbulent air from the zone 44 to the zone 46 between the rim 17 and ring 34 not only prevents such air from reaching the zone 43, but also reduces, if not eliminates, the turbulence and resultant losses which would occur as such air moves from zone 46 between the ring 34 and rim 17.

Accordingly, it will be seen that movement of the relatively smooth-flowing and non-turbulent air from zone 44 through the annular passageway 42 serves the dual purpose of reducing substantially the turbulence which normally does, and otherwise would, exist in zone 43 adjacent to the inside surface of the wheel rim 17, while at the same time preventing the turbulent air of zone 46 from creating turbulence between ring 34 and rim 17, and also aggravating such turbulence within the zone 43.

It has been found that, under circumstances substantially as shown in FIGURE 2, the performance of a centrifugal impeller can be improved in excess of 25 percent by using the guide ring 34 in the manner disclosed hereinabove. It has also been found that the amount of air permitted to pass through the annular passageway 42 has a material effect upon the increase in performance under a given set of structural conditions with respect to the remainder of the fan structure. Accordingly, one of the flow control devices 50 and 51 (FIGURES 16 and 17), respectively, may be utilized to control and vary the performance of the fan, particularly within the range of increased performance produced by the invention.

The modifications shown in FIGURES 4, 5, 6, 7, 14 and 15 serve primarily to illustrate a variety of other, similar structures, which may be utilized for the purpose of controlling the amount of air which passes over the inner and outer surfaces of the wheel rim 17 from the high pressure zone 44 toward the fan outlet. The structure shown in FIGURES 4, 5 and 6 serves the additional purpose of permitting the use of an independent source of air under pressure in excess of atmospheric pressure, where circumstances demand such.

The structure illustrated in FIGURES 8 to 13, inclusive, illustrates a variety of adaptations of the basic principles of the invention to an otherwise substantially conventional fan structure, including a scroll-type housing. FIGURES 9, 11 and 12 illustrate various structures for conveying the relatively smooth-flowing or non-turbulent air to a point where it will be, and can be, discharged along the opposite surfaces of the wheel rim, for the purpose of accomplishing the increase in performance of the wheel, as set forth in detail hereinabove with respect to the roof ventilator 10.

It will be recognized that the structure illustrated in FIGURE 12 is capable of accomplishing some, but not necessarily all, of the purposes of the invention. The FIGURE 12 structure does not include a conical ring, such as guide ring 84 in FIGURE 11, for positively guiding the non-turbulent air along a path disposed closely adjacent to, and radially outwardly of, the wheel rim 103 (FIGURE 12).

Although several particular embodiments of the invention have been disclosed in detail hereinabove for illustrative purposes, it will be understood that variations thereof, which do not depart from the scope of such disclosure, are fully contemplated unless specifically stated to the contrary in the appended claims.

We claim:

1. A centrifugal fan construction, comprising: an impeller housing having a central inlet opening and an outlet opening disposed radially outwardly of said inlet opening; an inlet cone mounted within said inlet opening; a centrifugal impeller within said housing and having an annular, coaxial rim, the axially inner end of said cone being adjacent to, substantially co-axial with and spaced radially inwardly from the radially inner edge of said rim; a source of substantially non-turbulent air and conduit means extending into said housing communicating between said source and the region surrounding said inner end of said cone, the pressure being greater in said region than in said impeller when said impeller is rotating; and guide means within said housing substantially encircling said inner end of said cone and said rim for directing the movement of said air from said region toward said impeller and radially outwardly along the inner and outer surfaces of said rim.

2. The structure of claim 1 wherein said guide means is a conical ring, the inner, circular edge of which co-axially encircles, and is spaced a short distance from, said cone near the radially inner edge of said rim, said rim being telescoped within said conical ring.

3. The structure of claim 1 wherein said conduit means includes an annular chamber extending around said cone in said region, and said guide means includes an annular outlet opening in said chamber directed at said rim, near the inner, circular edge thereof.

4. A device for increasing the performance of a centrifugal fan construction, comprising: an impeller housing having a central inlet opening and an outlet opening disposed radially outwardly of said inlet opening; an inlet cone mounted within said inlet opening; a centrifugal impeller within said housing and having an annular, co-axial rim, the axially inner end of said cone being adjacent to, co-axial with and spaced radially inwardly from the radially inner edge of said rim; a source of substantially non-turbulent air communicating with the region surrounding said inner end of said cone, the pressure being greater in said region than in said impeller when said impeller is rotating; and a conical guide ring co-axial with said cone and telescoping said rim, said ring being radially spaced outwardly from said rim and having its smallest circumference substantially encircling, and spaced radically from, said inner end of said cone.

5. The structure of claim 4 wherein the minimum, average, radial spacing between said rim and said cone is between 20 percent and 100 percent of the average, radial spacing between said cone and said smallest circumference of said ring.

6. The structure of claim 4 wherein the largest circumference of said conical guide ring defines a plane passing through the blades of said wheel substantially perpendicularly to the axis thereof.

7. The structure of claim 4 wherein said wheel has a plurality of substantially non-overloading blades and said rim is at least in part substantially parallel with the adjacent portion of said guide ring.

8. A device for increasing the performance of a centrifugal fan construction, comprising: an impeller housing having a central inlet opening and an outlet opening disposed radially outwardly of said inlet opening; an inlet cone mounted within said inlet opening; a centrifugal impeller disposed within said housing, the axially inner end of said cone being co-axial with, adjacent to and spaced from the said impeller; a source of non-turbulent air communicating with the zone surrounding said inner end of said cone; and a conical guide ring fixed with respect to said housing and co-axially telescoping adjacent portions of said impeller and the inner end of said cone, said ring being spaced radially from said impeller and said cone.

9. The structure of claim 8 wherein said conical guide ring is arranged with its largest circumference spaced from, and radially encircling, said impeller and defining a plane intersecting the blades of said impeller, and with its smallest circumference substantially uniformly spaced from, and radialy encircling, said inner end of said cone.

10. The structure of claim 9 wherein the radial spacing between said cone and said smallest circumference is between 5 percent and 50 percent of the radial spacing between said largest circumference and the circumference of said impeller.

11. In an improved, roof-type ventilator, the combination comprising: a support plate having a central opening; a centrifugal blower wheel having an annular rim on one axial side and coaxial support means extendable from the other side through said opening; a mounting ring encircling, and radially spaced from, said wheel near said rim; an inlet cone and means supporting same coaxial with, adjacent to, and spaced radially inwardly from, said rim; and a conical ring secured near its radially outer edge upon said mounting ring, said conical ring telescoping said rim and converging toward said cone, the radially inner edge of said conical ring co-axially encircling, and being radially spaced from, said cone near said rim.

12. A centrifugal fan construction, comprising: an impeller housing having a centrally disposed inlet opening and a peripherally disposed outlet opening; an inlet cone mounted upon said housing adjacent to, and coaxial with, said inlet opening; a centrifugal impeller disposed within said housing, said impeller having a circular backplate, a rim spaced from and coaxial with said backplate and a plurality of blades secured between said backplate and rim, said rim being convergent with said backplate radially outwardly, and the radially inner edge of said rim being substantially concentric with, spaced a small distance from, and slightly overlapping the axially inner end of said cone; guide means extending a substantial distance around said cone near said rim, said guide means being fixed with respect to said cone and radially spaced from the outer surface thereof to define at least an arcuate zone adjacent to said cone, opening adjacent the radially inner edge of said rim and shielded from the discharge of said impeller; conduit means communicable with a supply of substantially non-turbulent gas for connecting said supply to said zone at a point therein spaced from the inner axial end thereof, said gas having a higher pressure than the pressure in the region of the periphery of said impeller when it is rotating, whereby said gas flows from said zone along a surface of said rim toward said region.

13. The structure of claim 12 wherein the area defined by the inside edge of said rim is larger than the area defined by the outside surface of said cone adjacent to said axially inner end thereof, and the difference between these areas is less than the arcuate area defined between said guide means and said cone adjacent to said inner end of said zone.

14. A centrifugal fan construction, comprising: an impeller housing having a centrally disposed inlet opening and a peripherally disposed outlet opening; an inlet cone mounted upon said housing adjacent to, and coaxial with, said inlet opening; a centrifugal impeller disposed within said housing, said impeller having a circular backplate, a rim spaced from and coaxial with said backplate and a plurality of blades secured to said backplate and rim, said rim being convergent with said backplate radially outwardly, and the radially inner edge of said rim being substantially concentric with, and spaced a small distance radially outwardly of, the axially inner end of said cone; guide means extending a substantial distance circumferentially around said cone near said rim, said guide means being fixed with respect to said cone and radially spaced from the outer surface thereof to define an arcuate zone adjacent to said cone, opening adjacent the radially inner edge of said rim and shielded from the discharge of said impeller; conduit means communicable with a supply of substantially nonturbulent gas for connecting said supply to said zone at a point therein spaced from the inner axial end thereof, said gas having a higher pressure than the pressure in the region of the periphery of said impeller when it is rotating, whereby said gas flows from said zone along a surface of said rim toward said region.

15. In a centrifugal fan construction including a fan housing having a central inlet opening and a peripherally disposed outlet opening, and a centrifugal impeller disposed within said housing, said impeller having a plurality of blades and an annular rim secured to one axial end of said blades, said rim being near to and substantially coaxial with said inlet opening, a device for increasing the performance of said impeller, comprising: an inlet cone mounted upon said housing within said inlet opening, the axially inner end of said cone being coaxial with, adjacent to and spaced radially inwardly from the radially inner edge of said rim; a guide ring fixed with respect to said cone, said ring being spaced radially outwardly from, and telescoping the adjacent portions of, said rim and said cone, said ring and said cone defining a portion of an annular zone encircling said cone and opening toward and adjacent to said rim; a supply of substantially nonturbulent gas communicating with said zone, said gas having a higher pressure than the pressure near the periphery of said impeller when it is rotating, whereby said gas flows from said zone toward said impeller and is guided along a portion of the outer surface of said rim.

16. In a centrifugal fan construction including a fan housing having a central inlet opening and a peripherally disposed outlet opening, and a centrifugal impeller disposed within said housing, said impeller having a plurality of blades and an annular rim secured to one axial end of said blades, said rim being near to and substantially coaxial with said inlet opening, a device for increasing the performance of said impeller, comprising: an inlet cone mounted upon said housing within said inlet opening, the axially inner end of said cone being coaxial with, adjacent to and spaced radially inwardly from the radially inner edge of said rim; a guide ring fixed with respect to said cone, said ring being spaced radially outwardly from and telescoping said cone, said ring and said cone defining a portion of an annular zone encircling said cone and opening toward and adjacent to said rim; a supply of substantially nonturbulent gas and conduit means communicating between said source and said zone, said gas having a higher pressure than the pressure within said impeller when it is rotating, whereby said gas flows from said zone toward said impeller and along a surface of said rim.

17. The structure of claim 16 wherein said ring defines the frustum of a cone diverging toward and concentric with the rim of said impeller, said cone extending radially outwardly of said rim.

18. The structure of claim 16 including a casing member substantially surrounding said zone and secured to said guide ring, and control means operatively connected to said casing member for controlling the amount of nonturbulent gas entering into said zone.

19. In a centrifugal fan construction including a fan housing having a central inlet opening and a peripherally disposed outlet opening, and a centrifugal impeller disposed within said housing, said impeller having a plurality of blades and an annular rim secured to one axial end of said blades, said rim being near to and substantially coaxial with said inlet opening, a device for increasing the performance of said impeller, comprising: an annular inlet member mounted upon said housing adjacent said inlet opening and defining a passageway between said inlet opening and the rim of said impeller, the axially inner end of said inlet member being coaxial with, adjacent to and spaced radially inwardly of the radially inner edge of said rim; a guide ring fixed with respect to said inlet member, said ring being spaced radially outwardly from, and telescoping the adjacent portions of, said rim and said inlet member, said ring and said inlet member defining a portion of an annular zone encircling said inlet member and opening toward and adjacent said rim; a supply of substantially nonturbulent gas communicating with said zone, said gas having a higher pressure than the pressure near the periphery of said impeller when it is rotating, whereby said gas flows from said zone toward said impeller and is guided along a portion of the outer surface of said rim.

References Cited in the file of this patent
UNITED STATES PATENTS

| | | |
|---|---|---|
| 1,404,525 | Hotchkiss | Jan. 24, 1922 |
| 1,517,329 | Weiss et al. | Dec. 2, 1924 |
| 1,862,523 | Anderson | June 14, 1932 |
| 2,209,607 | Nutting | July 30, 1940 |
| 2,215,901 | Christman | Sept. 24, 1940 |
| 2,230,907 | Odor et al. | Oct. 5, 1943 |
| 2,582,902 | Gohl | Jan. 15, 1952 |
| 2,637,486 | Taylor | May 5, 1953 |
| 2,638,835 | Strawsine | May 19, 1953 |
| 2,690,293 | Muhlberg | Sept. 28, 1954 |
| 2,798,658 | McDonald | July 19, 1957 |

UNITED STATES PATENT OFFICE
CERTIFICATION OF CORRECTION

Patent No. 3,011,693                           December 5, 1961

Sewell H. Downs et al.

It is hereby certified that error appears in the above numbered patent requiring correction and that the said Letters Patent should read as corrected below.

Column 4, line 17, after "and" insert -- radially --; column 8, line 4, for "The" read -- This --; column 9, lines 58 and 59, for "radically" read -- radially --.

Signed and sealed this 17th day of April 1962.

(SEAL)
Attest:

ESTON G. JOHNSON
Attesting Officer

DAVID L. LADD
Commissioner of Patents